US009295902B2

(12) United States Patent
Lininger, Jr.

(10) Patent No.: US 9,295,902 B2
(45) Date of Patent: Mar. 29, 2016

(54) SKATEBOARD TRUCK AND CASTER WITH SUSPENSION MECHANISM

(76) Inventor: Robert Lininger, Jr., Redondo Beach, CA (US)

( * ) Notice: Subject to any disclaimer, the term of this patent is extended or adjusted under 35 U.S.C. 154(b) by 434 days.

(21) Appl. No.: 13/374,667

(22) Filed: Jan. 5, 2012

(65) Prior Publication Data

US 2013/0175774 A1    Jul. 11, 2013

(51) Int. Cl.
*A63C 17/01*      (2006.01)
*A63C 17/00*      (2006.01)
*B60B 33/00*     (2006.01)

(52) U.S. Cl.
CPC ......... *A63C 17/0093* (2013.01); *A63C 17/0033* (2013.01); *A63C 17/012* (2013.01); *A63C 17/01* (2013.01); *B60B 33/0063* (2013.01); *Y10T 16/184* (2015.01)

(58) Field of Classification Search
CPC .... A63C 17/011; A63C 17/01; A63C 17/012; A63C 17/02; A63C 17/015; A63C 17/0093
USPC ................................ 280/11.28, 87.042, 11.27
See application file for complete search history.

(56) References Cited

U.S. PATENT DOCUMENTS

| | | | | |
|---|---|---|---|---|
| 921,102 | A * | 5/1909 | Grout ........................ | 280/11.28 |
| 2,233,355 | A * | 2/1941 | Ware ......................... | 280/11.28 |
| 2,275,035 | A * | 3/1942 | Pardon ...................... | 280/11.28 |
| 2,676,812 | A * | 4/1954 | Owsen et al. .............. | 280/11.28 |
| 2,937,031 | A * | 5/1960 | Swett et al. ............... | 280/11.209 |
| 3,774,924 | A * | 11/1973 | Machatsch ................. | 280/11.28 |
| 4,109,925 | A * | 8/1978 | Williams et al. ........... | 280/11.28 |
| 4,152,001 | A * | 5/1979 | Christianson ............. | 280/11.28 |
| 4,194,752 | A * | 3/1980 | Tilch et al. ................ | 280/11.28 |
| 4,245,848 | A * | 1/1981 | Dudouyt .................... | 280/11.28 |
| 4,251,087 | A * | 2/1981 | Hansen ...................... | 280/11.28 |
| 4,402,521 | A * | 9/1983 | Mongeon ................... | 280/11.225 |
| 6,318,739 | B1 * | 11/2001 | Fehn, Jr. .................... | 280/11.28 |
| 6,547,262 | B1 * | 4/2003 | Yamada et al. ............ | 280/11.28 |
| 6,945,542 | B2 * | 9/2005 | Stewart ...................... | 280/11.27 |
| 7,104,558 | B1 * | 9/2006 | Saldana ..................... | 280/87.042 |
| 7,255,356 | B2 * | 8/2007 | Lin ............................ | 280/87.041 |
| 2015/0097352 | A1 * | 4/2015 | Ivazes ........................ | F16F 1/185 280/124.175 |

* cited by examiner

*Primary Examiner* — Katy M Ebner
*Assistant Examiner* — Emma K Frick
(74) *Attorney, Agent, or Firm* — James E. Brunton

(57) ABSTRACT

The present invention relates generally to skateboard and caster devices. More particularly, in a manner the invention concerns both dual wheel and single wheel axle supports of trucks and casters having a suspension mechanism for absorbing shock. The suspension mechanism is uniquely designed to progressively increase suspension resistance as forces acting on the mechanism increase by elastically deforming an independent arm in a manner to contact another arm or structure thereby transforming the independent arm into a dependent arm that results in a progressive resistance to a load until the forces are terminally engaged into a resilient abutment. A novel alignment mechanism functions to maintain the skateboard steering function.

9 Claims, 7 Drawing Sheets

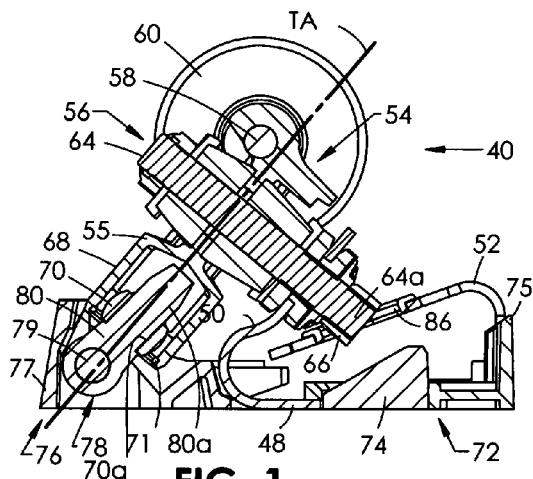
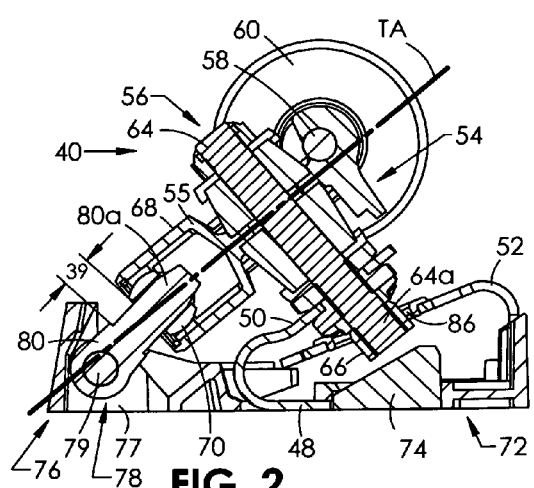
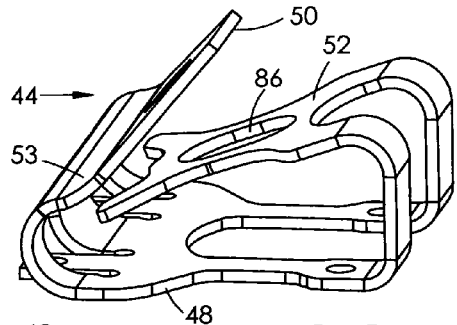
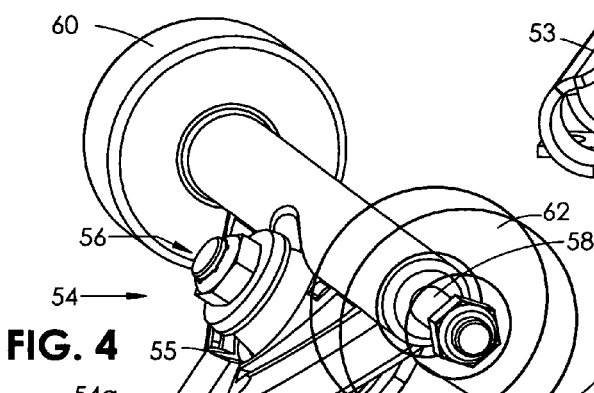
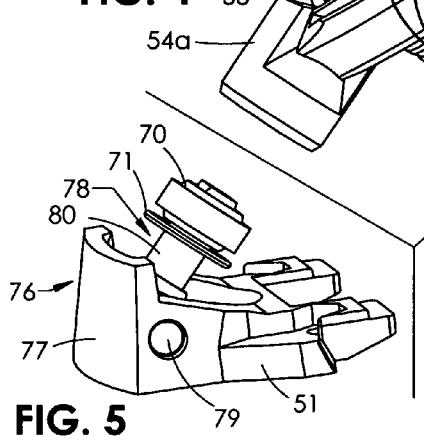
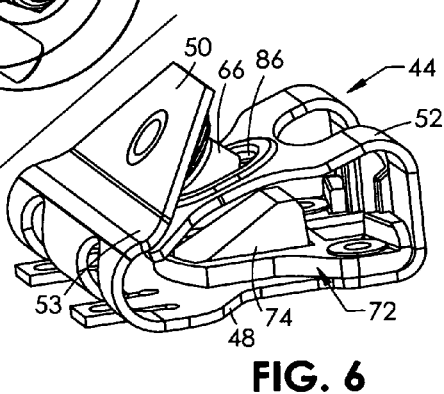

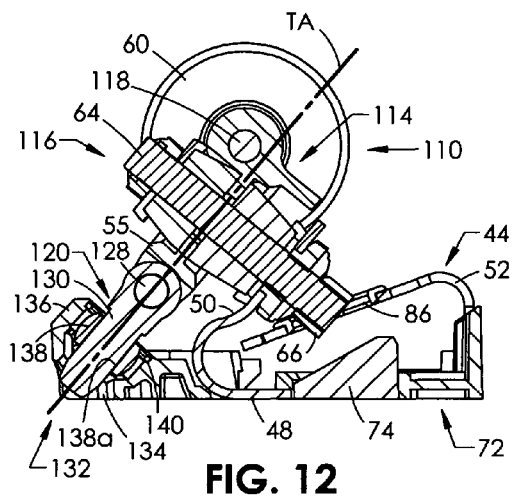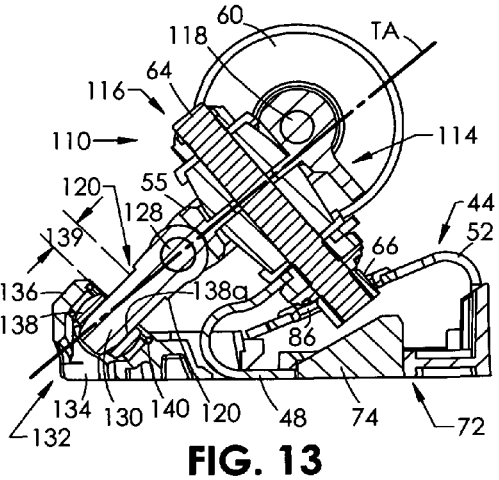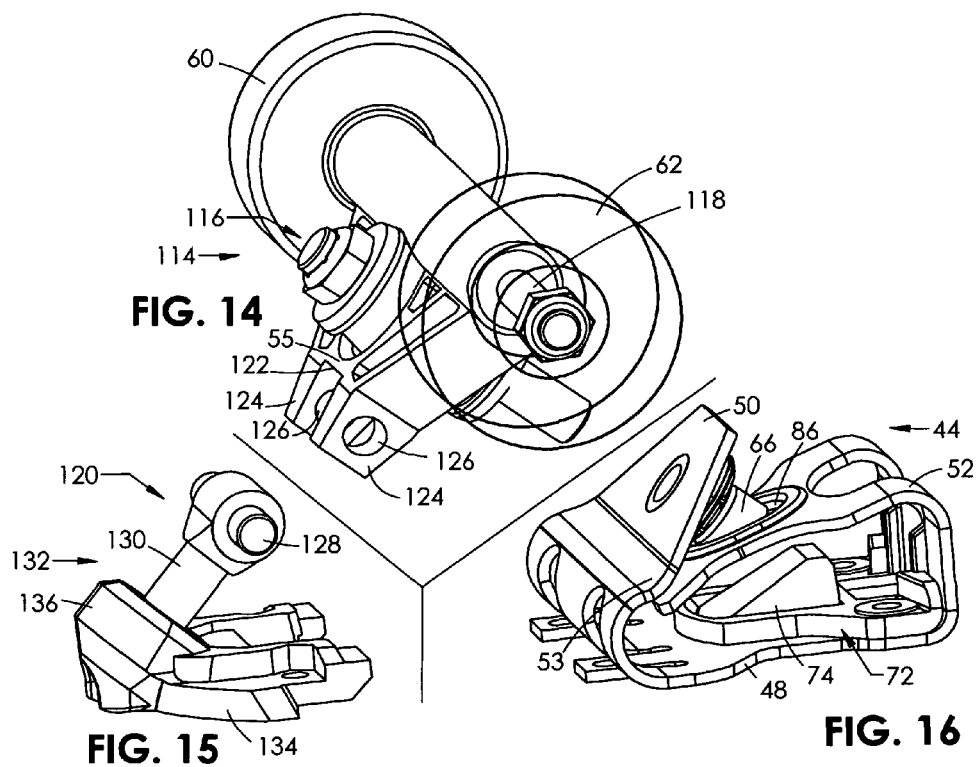

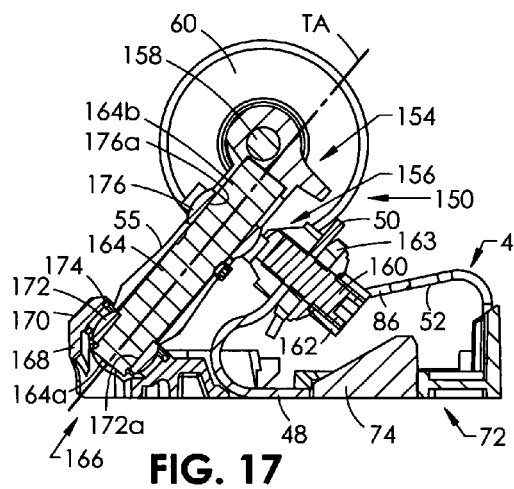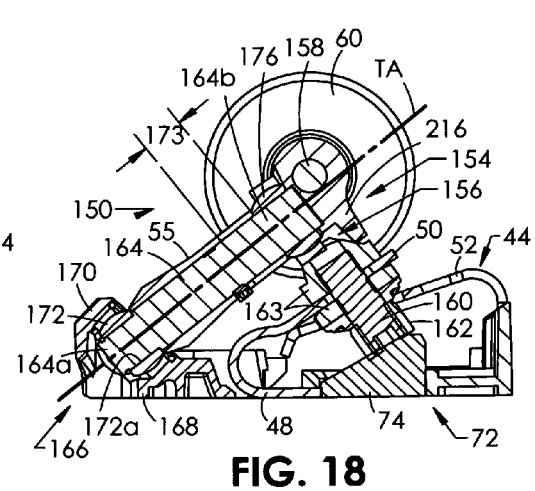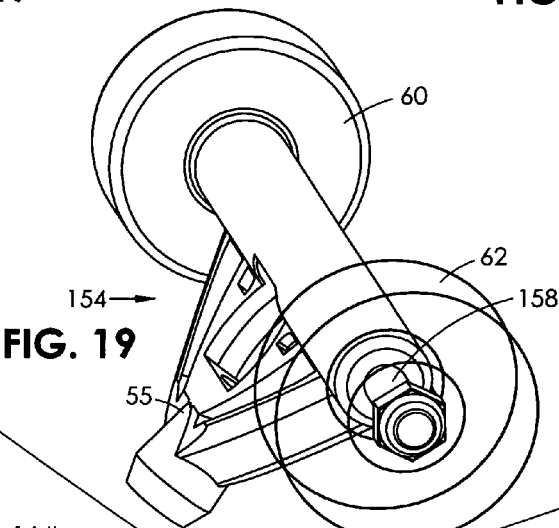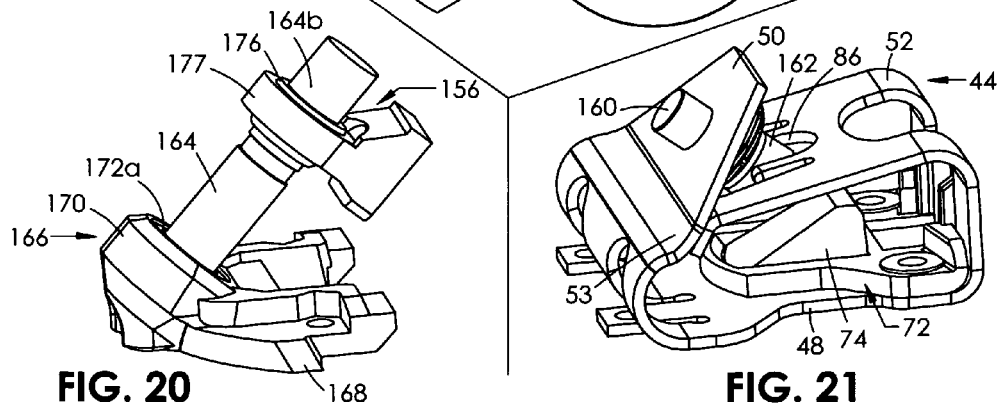

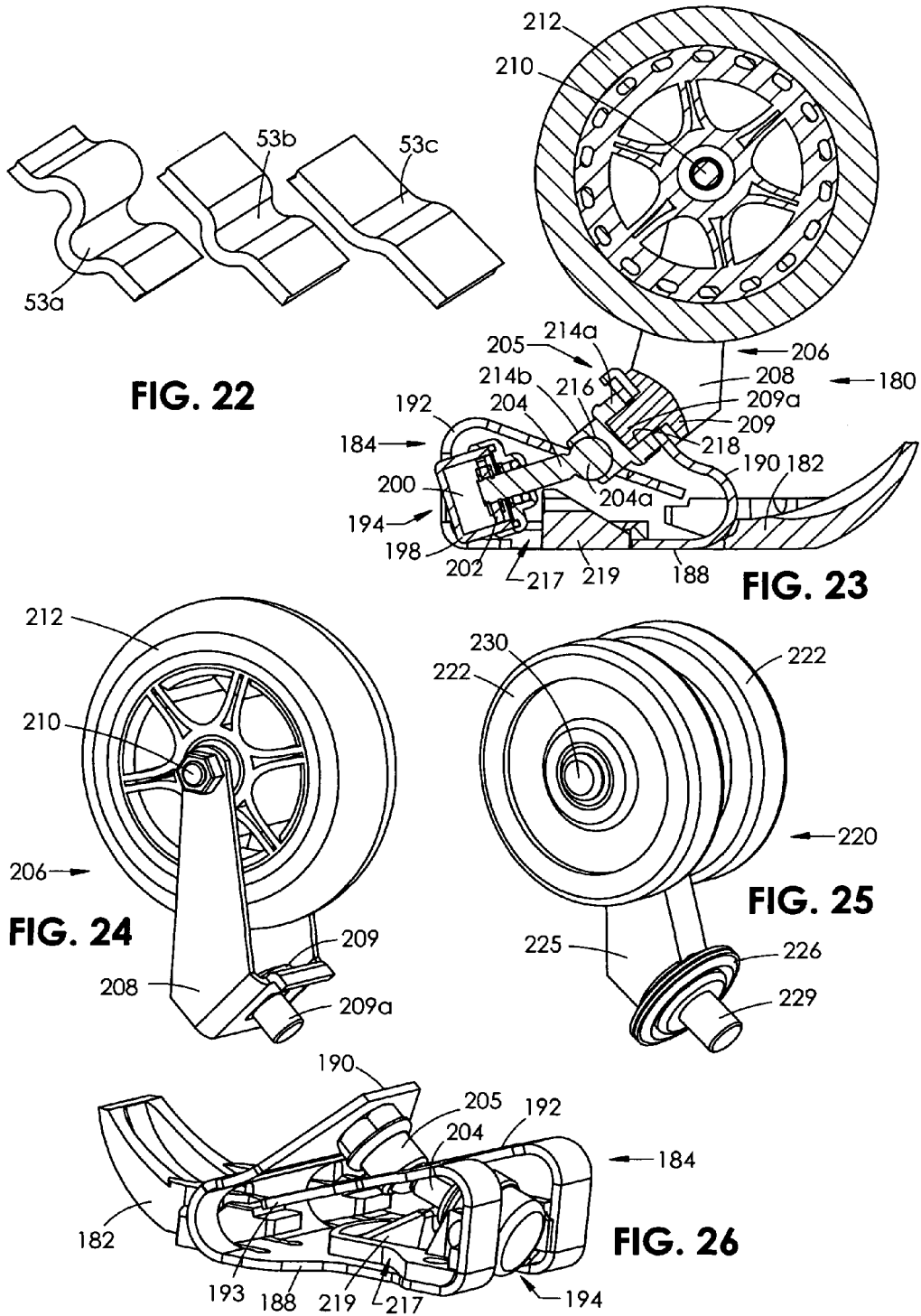

SKATEBOARD TRUCK AND CASTER WITH SUSPENSION MECHANISM

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to skateboards and skate devices such as quad wheel roller skates, multi-wheel scooters, and to casters and caster devices such as scooters, caster boards, wheelchairs and utility carts. More particularly, the invention concerns both dual wheel and single wheel axle support mechanisms and casters with novel suspension mechanisms designed to absorb shock. Also disclosed is an embodiment for an extendable tilt axis alignment device for a truck hanger enabling full tilt steering functions when a truck hanger is mounted on a biased suspension mechanism.

2. Description of Related Art Including Information Disclosed Under 37 CFR 1.97 and 1.98

Skateboards of various designs having a pair of trucks in opposing orientation disposed under a rider surface are well known in the art. The prior art trucks are typically fitted with a pair of wheels with steering being accomplished by the rider tilting the rider surface, thus pivoting the hangers on a tilt axis between 30° and 55°, rotating axles and wheels in opposite directions thus causing the board to turn. Two types of kingpin configurations for skateboard trucks are predominate in prior art. The first is the conventional kingpin truck consisting of a hanger that tilts on a kingpin which acts as the fulcrum for the hanger. The kingpin is mounted approximately perpendicular to the tilt axis through a central aperture of the hanger with the kingpin being fixedly attached to a mounting base. The hanger has a central alignment leg projecting in a transverse direction from the axle that maintains the tilt axis and is received by a pivot cup that is an articulation point in the mounting base. The hanger tilts along the axis and resistively compresses resilient tilt-crush bushings that bring the hanger back to a neutral position. The second is the torsion kingpin truck that consists of a hanger that tilts on a kingpin that is located longitudinally on the tilt axis so that the hanger can tilt on the kingpin to permit steering the truck. Various torsion mechanisms have also been disclosed that provide resistance to tilting and function to assist in bringing the hanger back to a neutral position.

Prior art designs of non-biased casters often include a U-shaped wheel fork with a transversely mounted axle having a single wheel disposed on the axle and located between the arms of the wheel fork. Another form of prior art caster is the split wheel caster which has a central body portion with a transversely mounted axle passing through the central body and projecting on both sides to receive two wheels. Though the split wheel caster has two wheels, it effectively performs in the same manner as a single wheel caster.

Prior art designs of non-biased axle support mechanisms for the skateboard and caster provide adequate performance over smooth surfaces, but can become extremely hazardous when a wheel of the device encounters an obstacle such as a small rock or minor curb transition. Because the prior art devices have no effective means to absorb the shock of the impact with a rock or curb transition, the rider can either be ejected from the device or dangerously lose control of the device.

For over a century, many types of biased suspension mechanisms have been suggested to absorb shock and provide the user with a more compliant and safer passage over irregular terrain. However, none of these prior art devices have been able to provide the novel attributes of the present invention regarding shock absorption, stability, functionality and weight.

By way of example, a biased skateboard truck with a conventional kingpin configuration is disclosed in U.S. Pat. No. 4,155,565 issued to de Caussin et al. The de Caussin device includes a truck that is mounted onto a separate biased plate-shaped member which comprises a duplication of the base structure and the biasing means and results in additional weight and undesirable added axle height thereby limiting functionality.

Another prior art truck construction with a conventional kingpin configuration and suspension mechanism is disclosed in U.S. Publication No. 2008/0252026A to Kang. In the Kang device, a biased plate-shaped member supports a hanger that is a non-extendable link between opposing inwardly facing independent arms. With this construction, when a force is applied to the truck, the arms bind and negate each other's movement and shock-absorbing potential.

U.S. Pat. No. 4,152,001 issued to Christianson, discloses an axle hanger that is mounted on a plate-shaped member. The Christianson device has the ability to conform to the terrain, but lacks a steering alignment mechanism to enable the hanger to maintain the steering tilt axis. Accordingly, the hanger is susceptible to axial forces that could cause loss of the integrity of the steering geometry and stability.

U.S. Pat. No. 7,219,907 to Chang concerns a torsion kingpin truck configuration that has a suspension mechanism but has limitations due to the independent movement of the axles as the bottom of the central body can scrape the ground if the suspension is compressed, thus requiring large wheels to avoid this undesirable condition.

U.S. Pat. No. 1,745,992 issued to Herold discloses a caster that compresses an elastomeric damper in a nutcracker fashion. The Herold device exhibits a very limited compression stroke and suffers unavoidable deterioration of the elastic damper due to repeated impact.

The prior art U.S. Pat. No. 2,738,542 issued to Clark discloses a rather commonly adopted suspension mechanism for a caster and includes a saddle-shaped mounting bracket, a U-shaped wheel fork, a hinge pin and two helical coil springs. However, the Clark device is unduly complex in that it incorporates many separate components in addition to the biasing means to support the mechanism, adding additional cost and weight to the caster assembly.

U.S. Pat. No. 5,394,589 issued to Braeger et al. discloses a somewhat simpler shock-absorbing caster, but uses multiple structural components not required in the novel apparatus of the present invention.

BRIEF SUMMARY OF THE INVENTION

The present invention relates generally to skateboard and caster devices. More particularly, the present invention concerns both dual wheel and single wheel axle supports of trucks and casters and discloses a unique suspension mechanism for absorbing shock. The novel suspension mechanism of the present invention progressively increases suspension resistance as forces acting on the mechanism increase by elastically deforming an independent arm to contact another arm or structure thereby transforming the independent arm into a dependent arm that results in a progressive resistance to a load until the forces terminally engage a resilient abutment. The present invention also concerns an embodiment for an extendable tilt axis alignment device for a truck hanger that enables full tilt steering functions when a truck hanger is mounted on a novel suspension mechanism.

With the foregoing in mind, it is an object of the present invention to provide a shock-absorbing suspension mechanism for use on skateboards and caster devices that markedly improves stability, riding enjoyment, and user safety by reducing undesirable shock and vibration.

Another object of the invention is to provide a shock-absorbing suspension mechanism of the aforementioned character that maintains control of the device even when used on rough and uneven surfaces.

Another object of the invention is to provide a shock-absorbing suspension mechanism of the character described that includes a suspension arm that is free to articulate and absorb shock and one that uniquely functions to progressively increase suspension resistance as forces acting on the mechanism increase.

Another object of the invention is to provide a shock absorbing mechanism of the character described in the preceding paragraph that includes an independent arm that is adapted to contact another arm or structure thereby transforming the independent arm into a dependent arm that results in a progressive resistance to the load until the forces terminally engage a resilient abutment.

Another object of the invention is to provide a shock-absorbing suspension mechanism of the class described in which a shock absorber is connected to the suspension mechanism to further dampen shock and vibration.

Another object of the invention is to provide a shock-absorbing suspension mechanism for axle support constructions of the type used on skateboards and cart devices in which the kingpin, kingpin mount or caster fastener projects through a first independent arm and is slidably engaged into a secondary independent arm thus providing additional axial stability.

Another object of the invention is to provide an extendable tilt axis alignment mechanism for use on a skateboard truck that permits the axle hanger to maintain a tilt axis throughout the suspension compression cycle and one which uses articulation points and extendable portions to counteract any axial forces encountered, thereby providing predictable and stable tilt steering from the truck in virtually all riding conditions.

Another object of the invention is to provide a shock-absorbing suspension mechanism and complementary extendable steering alignment device for use on a skateboard that maintains comparable attributes of axle height, weight and cost to prior art non-biased trucks.

Another object of the invention is to provide a shock-absorbing suspension caster that is extremely simple in construction, is cost-effective to build, and comprises only three primary assembly components, namely a biasing member, an axle and a wheel.

BRIEF DESCRIPTION OF SEVERAL VIEWS OF THE DRAWINGS

FIG. 1 is a cross-sectional view of the skateboard truck illustrated in FIG. 1A.

FIG. 2 is a cross-sectional view similar to FIG. 1, but showing the skateboard truck in a compressed state.

FIG. 3 is a generally perspective view of one form of the suspension member of the skateboard truck shown in FIGS. 1 and 1A.

FIG. 4 is a generally perspective view of the kingpin truck hanger assembly of the skateboard truck shown in FIG. 1.

FIG. 5 is a generally perspective view of the extendable tilt axis alignment mechanism of the skateboard truck shown in FIG. 1.

FIG. 6 is a generally perspective view of the suspension mechanism of the skateboard truck shown in FIG. 1.

FIG. 12 is a cross-sectional view of still another embodiment of the skateboard truck of the invention.

FIG. 13 is a cross-sectional view similar to FIG. 12, but showing the skateboard truck in a compressed state.

FIG. 14 is a generally perspective view of the kingpin truck hanger assembly of the skateboard truck shown in FIG. 12.

FIG. 15 is a generally perspective view of the extendable tilt axis alignment mechanism of the skateboard truck shown in FIG. 12.

FIG. 16 is a generally perspective view of the suspension mechanism of the skateboard truck shown in FIG. 12.

FIG. 17 is a cross-sectional view of yet another embodiment of the skateboard truck of the invention.

FIG. 18 is a cross-sectional view similar to FIG. 17, but showing the skateboard truck in a compressed state.

FIG. 19 is a generally perspective view of the kingpin truck hanger assembly of the skateboard truck shown in FIG. 17.

FIG. 20 is a generally perspective view of the extendable tilt axis alignment mechanism of the skateboard truck shown in FIG. 17.

FIG. 21 is a generally perspective view of the suspension mechanism of the skateboard truck shown in FIG. 17.

FIG. 22 is a generally perspective view showing variations of rib profiles formed transverse to the longitudinal axis of the independent arm of the suspension mechanism shown in FIG. 21.

FIG. 23 is a cross-sectional view of still another embodiment of the present invention.

FIG. 24 is a generally perspective view of the single wheel caster of the embodiment of the invention shown in FIG. 23.

FIG. 25 is a generally perspective view of a dual wheel caster usable with the suspension mechanism of the embodiment of the invention shown in FIG. 23.

FIG. 26 is a generally perspective view of the suspension mechanism of the embodiment of the invention shown in FIG. 23.

DETAILED DESCRIPTION OF THE INVENTION

Figure 1A:
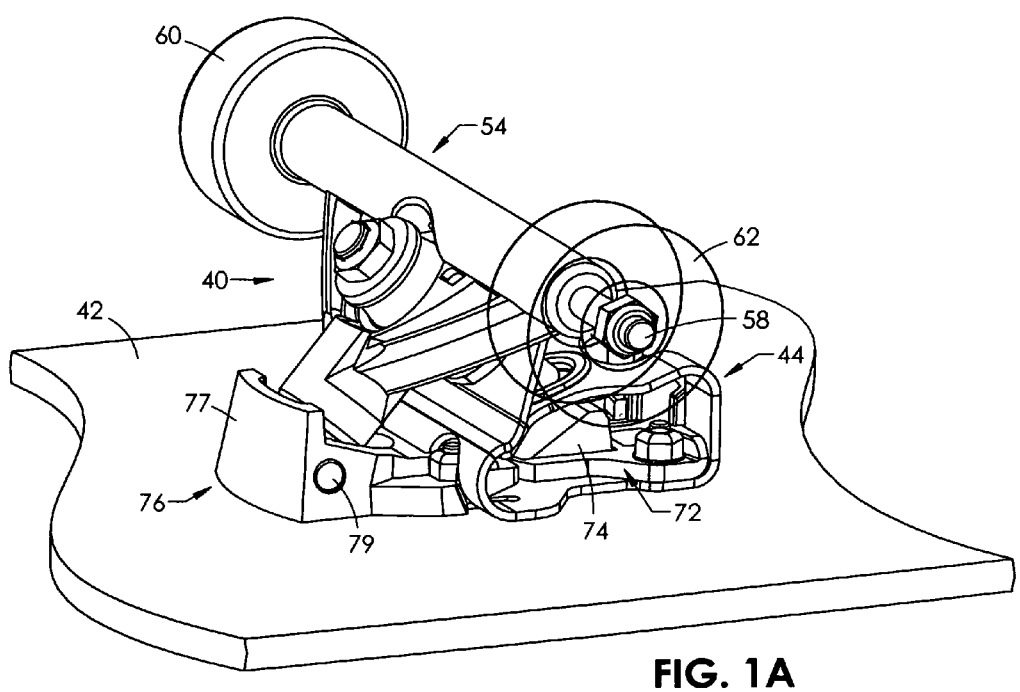
FIG. 1A is a generally perspective view of one form of skateboard truck of the invention mounted on a structural member.

Referring to the drawings and particularly to FIGS. 1 through 6, one form of the truck of the invention is there shown and generally designated by the numeral 40. As will become clear from the description that follows, the truck of the invention is usable with a skateboard, scooter, or like vehicle of the character having a structural member 42, such as a deck upon which the truck can be mounted. An important feature of the invention is the suspension mechanism 44 that is connected to the structural member in the manner shown in FIG. 1A. Suspension mechanism 44 here comprises a base 48 which, as shown in FIG. 1A, is disposed in engagement with the underside of the structural member 42, a first flex member 50 connected to base 48 and extending angularly outwardly therefrom and a second flex member 52 connected to the base and extending outwardly therefrom in a direction toward the first flex member (see FIG. 3). As best seen in FIG. 3, first flex member 50 of said suspension mechanism extends from base 48 at an angle of between about 25° and about 65°. As illustrated in FIGS. 1 and 2, first flex member 50 is constructed and arranged to flex between a first position shown in FIG. 1 and a second position shown in FIG. 2 wherein it resides proximate second flex member 52. As best seen in FIGS. 3 and 6, first flex member 50 is provided with a transversely extending, concave rib 53 that tends to enhance the flexing capability of member 50. It is to be understood that the transversely extending rib can be formed in various configurations. For example, FIG. 22 illustrates several alternate variations of rib profiles that can be formed in first flex member 50, which variations are identified in FIG. 22 as 53a, 53b and 53c respectively.

Suspension member 46 is preferably constructed from a single piece of material selected from the group consisting of metal, plastic, fiberglass, KEVLAR® and carbon fiber.

Connected to first flex member 50 is a hanger assembly 54, the character of which is shown in FIG. 4 of the drawings. Hanger assembly 54 has a tilt axis "TA", a hanger body 54a and a pivot leg 55 affixed to hanger body 54a and disposed substantially parallel to the pivot axis. Hanger assembly 54 also comprises a kingpin assembly 56, an axle 58 connected to the kingpin assembly, and first and second wheels 60 and 62 that are rotatably mounted on axle 58. As illustrated in FIG. 1A of the drawings, the base of the suspension mechanism 44 is disposed intermediate the underside of support structure 42 and kingpin assembly 56. Kingpin assembly 56 includes a kingpin 64 and an alignment guide 66. Extending outwardly from kingpin 64 is an alignment sleeve 68 that houses a rotatably mounted spherical bearing 70 that has a central bore 70a.

Operably associated with hanger assembly 54 is the important alignment means of the invention which functions to maintain the orientation of the tilt axis of the hanger assembly as the first flex member 50 flexes between its first and second position. The construction and operation of the alignment means will presently be described.

Also connected to base 48 of the suspension member 44 is a bumper assembly 72 that includes a bumper stop 74 which, in a manner presently to be described, is engagable by the kingpin 64 of the kingpin assembly 56.

In the present form of the invention, the important alignment means comprises an alignment assembly 76 that includes a body portion 77 that is connected to the structural member 42 and to the suspension mechanism 44 in the manner illustrated in FIG. 1A. Alignment assembly 76 also includes a hinge pin assembly 78 that is rotatably connected to body portion 77 and includes a transversely extending pin portion 79 and a connector member 80 that is connected to pin portion 79 and extends outwardly therefrom. As seen in FIGS. 1 and 2, the connector member 80 is receivable within the central bore 70a of spherical bearing 70 for reciprocal movement therewithin between the first position shown in FIG. 1, through a distance 39 into the second position shown in FIG. 2.

When the trucks of the invention are connected to the skateboard deck 42 in the manner illustrated in FIG. 1A, the skateboard can be operated in a conventional manner with steering being accomplished by the rider tilting the rider surface from side to side, thus pivoting the hangers on the tilt axis "TA" between 30° and 55° thus causing the skateboard to turn. As illustrated in FIGS. 1 and 2, as forces are exerted by the rider on the novel suspension mechanism 44 of the invention, the first flex member 50 will flex from the first position shown in FIG. 1 toward the second position shown in FIG. 2 and toward the second flex member 52.

As the first flex member 50 flexes toward the second position, the kingpin assembly 56, which is connected to the first flex member by appropriate fasteners 84 in the manner shown in FIGS. 1 and 2, also moves downwardly. More particularly, as shown in FIG. 2, the lower end portion 64a of kingpin 64, along with the lower end portion of the alignment guide 66, moves into an aperture 86 formed in the second flex member 52 of the suspension mechanism and in a direction toward the bumper stop 74 of the bumper assembly 72.

It is to be noted that the suspension mechanism is uniquely designed to progressively increase suspension resistance as forces acting on the mechanism increase by elastically deforming the first flex member in a manner to contact the second flex member, thereby transforming the first flex member into a dependent arm that results in a progressive resistance to a load until the forces are terminally engaged into the bumper stop 74.

As the kingpin assembly 56 moves downwardly, the end portion 80a of the connector member 80 of the alignment assembly of the alignment means of the invention, moves reciprocally inwardly of the central bore 70a of spherical bearing 70 that is housed within alignment sleeve 68 of the kingpin assembly 56. Spherical bearing 70 is maintained in position within the alignment sleeve by a retainer clip 71 (FIG. 5).

Referring now to FIGS. 7 through 11 of the drawings, an alternate form of the truck of the invention is there shown and generally designated by the numeral 90. This embodiment of the invention is similar in many respects to the embodiment shown in FIGS. 1 through 6 of the drawings and like numerals are used in FIGS. 7 through 11 to identify like components.

The primary difference between this latest embodiment of the invention and the earlier described embodiment resides in a differently configured hanger assembly and a differently configured alignment means. As in the earlier described embodiment, an important feature of this latest form of the invention resides in the suspension mechanism 44 that is substantially identical in construction and operation to that previously described.

Figure 10:
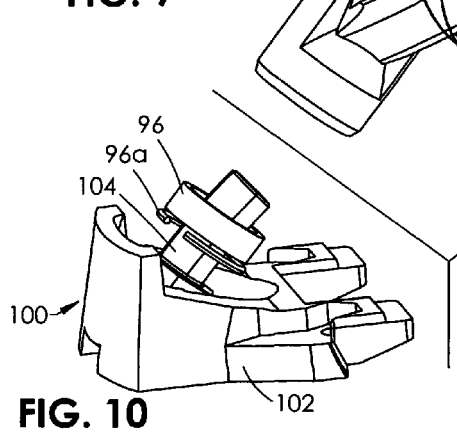
FIG. 10 is a generally perspective view of the extendable tilt axis alignment mechanism of the skateboard truck shown in FIG. 7.
Figure 11:
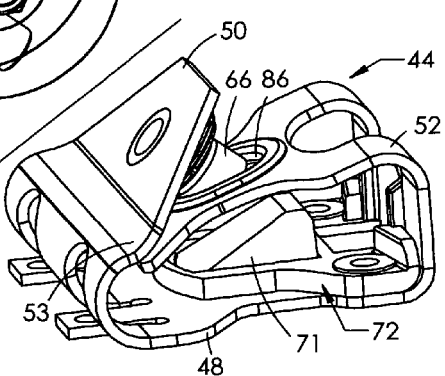
FIG. 11 is a generally perspective view of the suspension mechanism of the skateboard truck shown in FIG. 7.

Connected to the first flex member 50 is a hanger assembly 94 of the invention that is of somewhat different construction. However, as in the earlier described embodiment of the invention, hanger assembly 94 has a tilt axis "TA" and comprises a kingpin assembly 56, an axle 58 connected to the kingpin assembly, and first and second wheels 60 and 62 that are rotatably mounted on axle 58. Kingpin assembly 56 also includes a kingpin 64 and an alignment guide 66 that are substantially identical in construction and operation to those previously described. Extending outwardly from kingpin 64 is an alignment sleeve 68 that houses a differently constructed bearing 96. More particularly, bearing 96 here comprises a rolling element bearing that has an outer race 98 and a plurality of circumferentially spaced ball bearings 98*a* that cooperate to define a central opening 99. Bearing 96 is maintained in position within the alignment sleeve by a retainer clip 96*a* (FIG. 10).

Operably associated with hanger assembly 94 is the important alignment means of this latest form of the invention which functions to maintain the orientation of the tilt axis of the hanger assembly as the first flex member 50 flexes between its first and second position. The construction and operation of this alternate form of the alignment means of the invention will presently be described.

Also connected to base 48 of the suspension member 44 is a bumper assembly 72 that is substantially identical in construction and operation to that previously described and includes a bumper stop 74 which is engagable by the kingpin 64 of the kingpin assembly 56.

Figure 7:
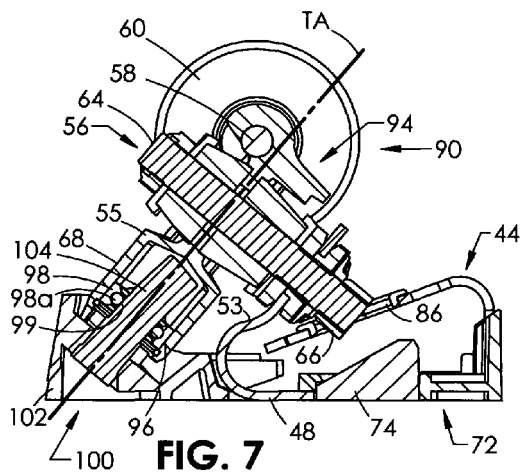
FIG. 7 is a cross-sectional view of an alternate embodiment of the skateboard truck of the invention.
Figure 8:
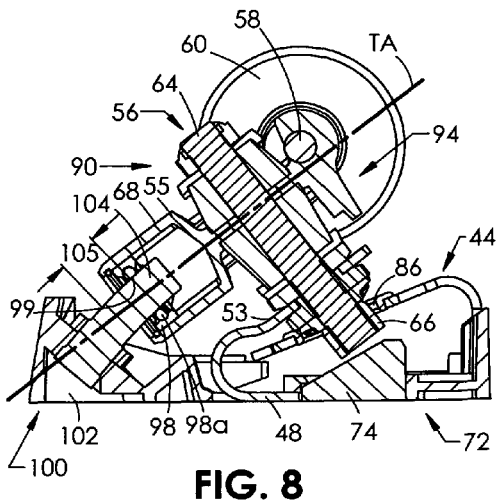
FIG. 8 is a cross-sectional view similar to FIG. 7, but showing the skateboard truck in a compressed state.
Figure 9:
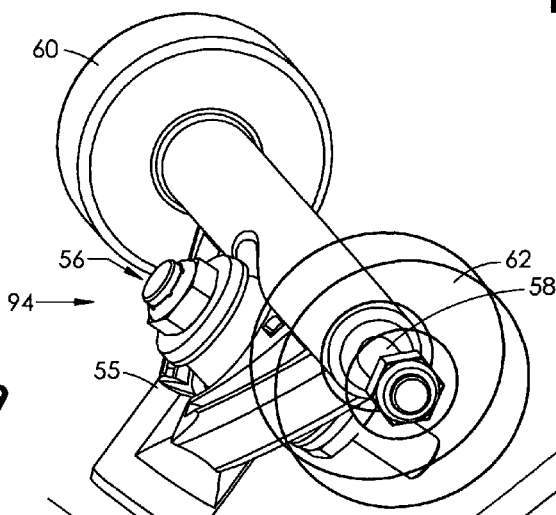
FIG. 9 is a generally perspective view of the kingpin truck hanger assembly of the skateboard truck shown in FIG. 7.

In the present form of the invention, the important alignment means comprises an alignment assembly 100 that includes a body portion 102 that is connected to the structural member 42 and to the suspension mechanism 44 in the manner illustrated in FIGS. 7 and 8. Alignment assembly 100 here uniquely comprises a curved connector member 104 that is receivable within the central bore 99 of bearing 96 for reciprocal movement therewithin between the first position shown in FIG. 7, and through a distance 105 into the second position shown in FIG. 8. With this novel construction, as the first flex member 50 flexes between its first and second position, connector member 104 functions to positively maintain the orientation of the tilt axis of the hanger assembly.

Turning next to FIGS. 12 through 16 of the drawings, still another form of the truck of the invention is there shown and generally designated by the numeral 110. This embodiment of the invention is also similar in many respects to the embodiment shown in FIGS. 1 through 6 of the drawings and like numerals are used in FIGS. 12 through 16 to identify like components.

The primary difference between this latest embodiment of the invention and the earlier described embodiments once again resides in the differently configured hanger assembly and the differently configured alignment means.

As in the earlier described embodiments, an important feature of this latest form of the invention resides in the suspension mechanism 44 that is substantially identical in construction and operation to that previously described.

Connected to the first flex member 50 is a hanger assembly 114 of the invention that is of somewhat different construction. However, as in the earlier described embodiment of the invention, hanger assembly 114 has a tilt axis "TA" and comprises a kingpin assembly 116, an axle 118 connected to the kingpin assembly, and first and second wheels 60 and 62 that are rotatably mounted on axle 118. Kingpin assembly 116 also includes a kingpin 64 and an alignment guide 66 that are substantially identical in construction and operation to those previously described. Extending outwardly from kingpin 64 is a hinge pin assembly 120 that is rotatably carried by the yoke portion 122 of the differently configured kingpin assembly 116. As best seen in FIG. 14, yoke portion 122 here comprises a pair of spaced apart legs 124, each of which is provided with a bore 126. Bores 126 rotatably receive the end portions of the transversely extending pin portion 128 of the hinge pin assembly 120. Extending outwardly from pin portion 128 is a connector member 130.

In this latest form of the invention, the differently configured alignment means comprises an alignment assembly 132 that includes a body portion 134 that is connected to the structural member 42 and to the suspension mechanism 44 in the manner illustrated in FIGS. 12 and 13. As before, alignment assembly 132 functions to maintain the orientation of the tilt axis of the hanger assembly as the first flex member 50 flexes between its first and second position. Alignment assembly 132 also includes a housing 136 that houses a spherical bearing 138 that has a central bore 138*a*. Bearing 138 is maintained in position within housing 136 by a retainer clip 140 (FIG. 12). As depicted in FIGS. 12, 13 and 15, the connector member 130 of the hinge pin assembly 120 is receivable within the central bore 138*a* of spherical bearing 138 for reciprocal movement therewithin between the first position shown in FIG. 12 and through the distance 139 into the second position shown in FIG. 13. With this novel construction, as the first flex member 50 flexes between its first and second position, connector member 130 functions to positively maintain the orientation of the tilt axis of the hanger assembly.

Also connected to base 48 of the suspension member 44 is a bumper assembly 72 that is substantially identical in construction and operation to that previously described and includes a bumper stop 74 which is engagable by the kingpin 64 of the kingpin assembly 116.

Turning next to FIGS. 17 through 21 of the drawings, yet another form of the truck of the invention is there shown and generally designated by the numeral 150. This embodiment of the invention is similar in some respects to the embodiment shown in FIGS. 12 through 16 of the drawings and like numerals are used in FIGS. 17 through 21 to identify like components.

As in the earlier described embodiments, an important feature of this latest form of the invention resides in the suspension mechanism 44 that is substantially identical in construction and operation to that previously described.

Connected to the first flex member 50 is a hanger assembly 154 of the invention that is of somewhat different construction. However, as in the earlier described embodiment of the invention, hanger assembly 154 has a tilt axis "TA" and comprises a kingpin assembly 156, an axle 158 connected to the kingpin assembly, and first and second wheels 60 and 62 that are rotatably mounted on axle 158. Kingpin assembly 156 here includes a threaded stub connector 160 and an alignment guide 162 that, along with suitable locking nuts 163, function to interconnect the kingpin assembly with the first flex member 50 in the manner illustrated in FIGS. 17 and 18. Also forming a part of the kingpin assembly is an elongated connector 164 that extending outwardly from axle 158.

In this latest form of the invention, the differently configured alignment means comprises an alignment assembly 166 that includes a body portion 168 that is connected to the structural member 42 and to the suspension mechanism 44 in the manner illustrated in FIGS. 17 and 18. As before, alignment assembly 166 functions to maintain the orientation of the tilt axis of the hanger assembly as the first flex member 50 flexes between its first and second position. Alignment assembly 166 also includes a housing 170 that houses a spherical bearing 172 that has a central bore 172*a*. Bearing 172 is maintained in position within housing 170 by a retainer clip 174 (FIG. 17). As depicted in FIGS. 17, 18 and 20, the end portion 164*a* of elongated connector 164 is receivable within the central bore 172*a* of spherical bearing 172. The end portion 164b of elongated connector 164 is also receivable within the central bore 176a of a second spherical bearing 176 that is mounted within a housing 177 that forms a part of kingpin assembly 156 (FIG. 20). End portion 164b is movable within second spherical bearing 176 between the first position shown in FIG. 17 and through the distance 173 into the second position shown in FIG. 18. With this novel construction, as the first flex member 50 flexes between its first and second position, connector member 164 functions to positively maintain the orientation of the tilt axis of the hanger assembly.

Also connected to base 48 of the suspension member 44 is a bumper assembly 72 that is substantially identical in construction and operation to that previously described and includes a bumper stop 74 which is engagable by the end of the threaded stub connector 160 (see FIG. 18).

Referring next to FIGS. 23 through 26 of the drawings, an alternate embodiment of the invention is there shown. This embodiment concerns a novel caster assembly 180 for use on carts, caster boards, wheelchairs and the like having a structural member 182 (FIG. 23). Caster assembly 180 here comprises a suspension mechanism 184 that is connected to the structural fender member 182. This novel suspension mechanism here comprises a suspension member having a base 188, a first flex member 190 connected to base 188 and extending angularly outwardly therefrom, and a second flex member 192 connected to base 188. Second flex member 192 comprises a pair of transversely spaced arms 193 that extend toward first flex member 190 in the manner depicted in FIG. 26.

Connected to suspension mechanism 184 and disposed between the transversely spaced arms 193 of second flex member 192 is a shock absorber assembly 194. Shock absorber assembly 194 here comprises a hollow housing 198 having an inner chamber 200 and a shock absorber plate 202 that reciprocates within chamber 200. Connected to shock absorber plate 202 is an elongate connector rod 204 that has a generally spherically shaped end portion 204a.

Connected to shock absorber assembly 194 by means of a connector assembly 205 is a caster wheel assembly 206 that here comprises a yoke-like wheel support 208, a connector pin 209 that is carried by the yoke-like wheel support, an axle 210 connected to the wheel support and a wheel 212 that is rotatably mounted on axle 210. Connector assembly 205, which is connected to first flex member 190 by suitable connectors in the manner shown in FIG. 23, includes a connector housing 214 having an upper portion 214a and a lower portion 214b. Lower portion 214b is provided with a socket 216 that rotatably receives the generally spherically shaped end portion 204a of connector rod 204. Upper portion 214a is provided with a central bore 218 that receives the cylindrical shank portion 209a of connector pin 209 so as to enable the caster wheel assembly 206 to be interconnected with the suspension mechanism 184 in the manner shown in FIG. 23. End portion 204a and connector housing lower portion 214b terminate into bumper assembly 219 to stop movement.

Referring to FIG. 25, an alternate form of caster wheel assembly is there shown and generally designated by the numeral 220. This alternate form of caster wheel assembly can be connected to the suspension mechanism 184 in the manner previously described using connector assembly 205. Caster wheel assembly 220 here comprises a wheel support 225, a swivel 226, a connector pin 229 that is carried by the wheel support, an axle 230 connected to the wheel support and a pair of wheels 222 that are rotatably mounted on axle 230.

Figures 27, 28:
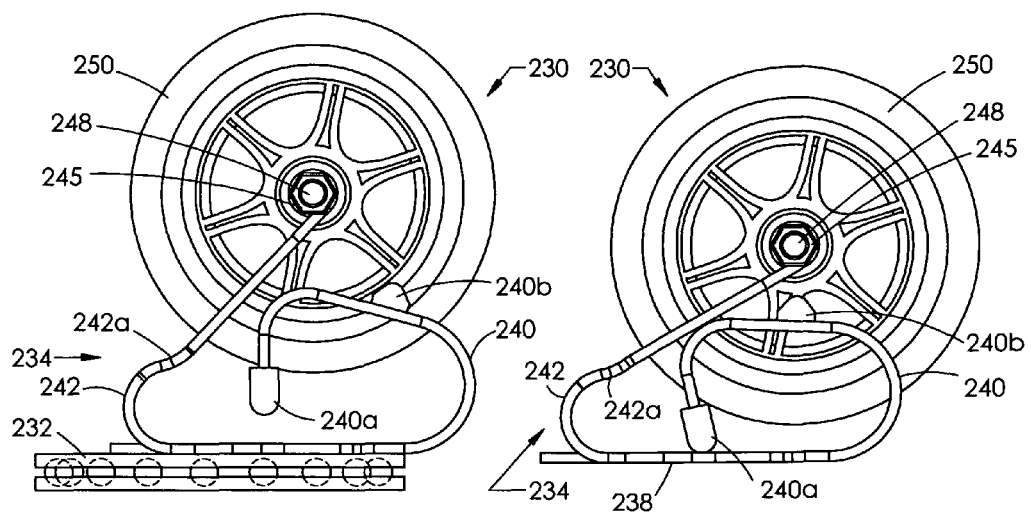
FIG. 27 is a cross-sectional view of yet another embodiment of the invention.
FIG. 28 is a cross-sectional view similar to FIG. 27, but showing the mechanism in a compressed state.
Figures 29, 30:
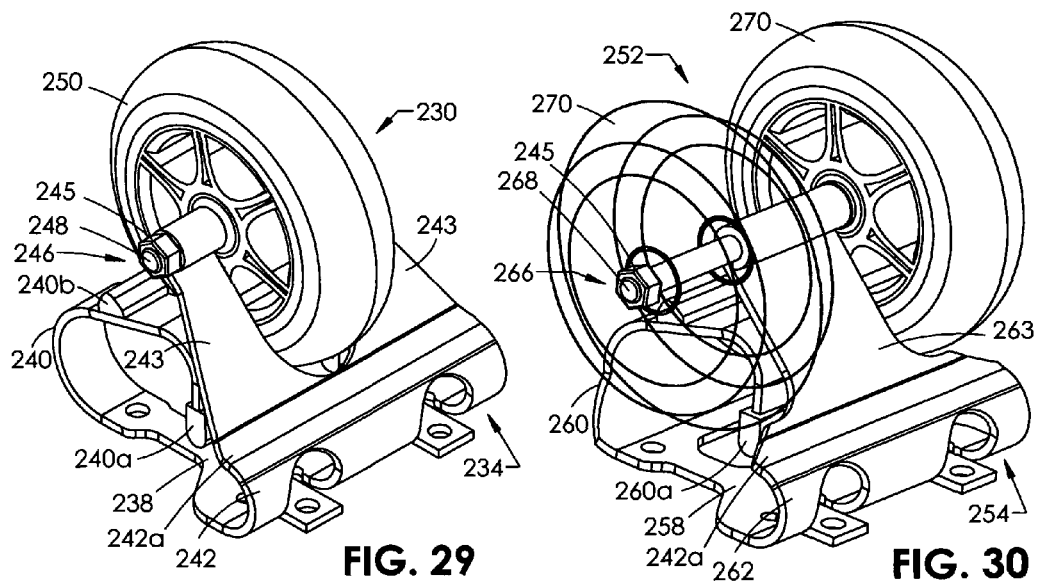
FIG. 29 is a generally perspective view of the embodiment of the invention shown in FIG. 27.
FIG. 30 is a generally perspective view of yet another embodiment of the invention.

Referring to FIGS. 27 through 29 of the drawings, still another embodiment of the invention is there shown. This embodiment concerns a novel caster assembly 230 for use on carts, caster boards, wheelchairs and the like having a structural member such as swivel 232 (FIG. 23). Caster assembly 230 here comprises a suspension mechanism 234 that is connected to the structural member 232. This novel suspension mechanism here comprises a base 238, a first flex member 240 connected to base 238 and extending angularly outwardly therefrom, and a second flex member 242 connected to base 238. Second flex member 242 comprises a pair of transversely spaced arms 243 that extend toward first flex member 190 in the manner depicted in FIG. 27. Second flex member 242 is provided with a transversely extending, concave rib 242a that functions in the manner previously described to enhance the flexing of second flex member 242.

Connected to second flex member 242 by appropriate fasteners 245 in the manner illustrated in the drawings, is a caster wheel assembly 246 that here comprises an axle 248 and a wheel 250 that is rotatably mounted on axle 248.

It is to be noted that the suspension mechanism is uniquely designed to progressively increase suspension resistance as forces acting on the mechanism increase by elastically deforming the second flex member 242 in a manner to contact the first flex member 240, thereby transforming the first flex member into a dependent arm that results in a progressive resistance to a load until the forces are terminally engaged by the end portion 240a of the first flex member 240, engaging the base 238 (see FIG. 28) and second arm 242, terminally engaging stop 240b disposed on first flex member 240.

Referring finally to FIG. 30 of the drawings, yet another embodiment of the invention is there shown. This embodiment is somewhat similar to that shown in FIGS. 27 through 29 and also concerns a novel caster assembly 252 for use on carts, caster boards, wheelchairs and the like having a structural member such as, for example a swivel 232 of the character shown in FIG. 23. Caster assembly 252 here comprises a suspension mechanism 254 that is connected to the structural member. This novel suspension mechanism here comprises a base 258, a first flex member 260 connected to base 258 and extending angularly outwardly therefrom, and a second flex member 262 connected to base 258. Second flex member 262 comprises an outwardly extending arm 263 that extends toward first flex member 260 in the manner depicted in FIG. 30. Second flex member 262 is provided with a transversely extending, concave rib 262a that functions in the manner previously described to enhance the flexing of second flex member 262.

Connected to second flex member 262 by appropriate fasteners "F" in the manner illustrated in the drawings, is a caster wheel assembly 266 that here comprises an axle 268 and a pair of transversely spaced apart wheels 270 that is rotatably mounted on axle 268.

It is to be noted that, as before, the suspension mechanism is uniquely designed to progressively increase suspension resistance as forces acting on the mechanism increase by elastically deforming the second flex member 262 in a manner to contact the first flex member 260, thereby transforming the first flex member into a dependent arm that results in a progressive resistance to a load until the forces are terminally engaged by the end portion 260a of the first flex member 260.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

The invention claimed is:

1. A truck for a skateboard or a scooter, having a structural member having an underside, said truck comprising:
   a. a suspension mechanism connected to the structural member, said suspension mechanism comprising a suspension member having a base disposed in engagement with the underside of the structural member and a first flex member connected to said base and extending angularly outwardly therefrom, said first flex member being constructed and arranged to flex between a first and second position and a second flex member connected to said base and extending outwardly therefrom in a direction toward said first flex member, said first flex member being constructed and arranged to flex toward said second flex member;
   b. a hanger assembly connected to the structural member, said hanger assembly having an axle, at least one wheel rotatably mounted on said axle; a hanger body including an alignment leg extending from said axle; a bearing mounted in alignment with said alignment leg, said bearing having a central bore; a kingpin assembly connected to said first flex member, said kingpin assembly including a kingpin, said base of said suspension mechanism being disposed between the underside of said structural member and said kingpin assembly; and
   c. an alignment assembly connected to the structural member, said alignment assembly including a body portion connected to the underside of the structural member and a connector member connected to said body portion and extending therefrom, said connector member being receivable within said bearing of said hanger assembly for reciprocal movement therewithin.

2. The truck defined in claim 1, further including a bumper assembly connected to said base of said suspension member and including a bumper stop engagable by said kingpin assembly.

3. The truck as defined in claim 1 in which said first flex member of said suspension member of said suspension mechanism extends from said base at an angle of between about 25° and about 65°.

4. The truck as defined in claim 1 in which said first flex member of said suspension member of said suspension mechanism is yieldably deformable from a first position to a second position wherein said first flex member is in engagement with said second flex member.

5. The truck as defined in claim 1 in which said first flex member of said suspension member of said suspension mechanism is provided with a transversely extending concave rib portion.

6. A truck for a skateboard or a scooter, having a structural member, said truck comprising:
   a. a suspension mechanism connected to the structural member and comprising a suspension member having a base and a first flex member connected to said base and extending angularly outwardly therefrom, said first flex member being constructed and arranged to flex between a first and second position and a second flex member connected to said base and extending outwardly therefrom in a direction toward said first flex member, said second flex member being provided with an aperture;
   b. a hanger assembly connected to said first flex member, said hanger assembly having a hanger body, a tilt axis, an alignment leg affixed to said hanger body and disposed substantially parallel to said tilt axis, said hanger assembly further comprising a kingpin assembly, an axle and at least one wheel rotatably mounted on said axle, said kingpin assembly including a kingpin having an alignment guide receivable within said aperture of said second flex member; and
   c. an alignment means operably associated with said hanger assembly for maintaining the orientation of said tilt axis of said hanger assembly as said first flex member flexes between said first and second position.

7. A truck for a skateboard or a scooter, having a structural member, said truck comprising:
   a. a suspension mechanism connected to the structural member, said suspension mechanism comprising a suspension member having a base and a first flex member connected to said base and extending angularly outwardly therefrom, said first flex member being constructed and arranged to flex between a first and second position and a second flex member connected to said base and extending outwardly therefrom in a direction toward said first flex member, said second flex member being provided with an aperture;
   b. a hanger assembly connected to said first flex member, said hanger assembly having an axle, at least one wheel rotatably mounted on said axle; a hanger body including an alignment leg extending from said axle; a bearing mounted in alignment with said alignment leg, said bearing having a central bore; a kingpin assembly connected to said first flex member, said kingpin assembly including a kingpin, said kingpin being receivable within said aperture of said second flex member; and
   c. an alignment assembly connected to the structural member, said alignment assembly including a body portion and a connector member connected to said body portion and extending therefrom, said connector member being receivable within said bearing of said hanger assembly for reciprocal movement therewithin.

8. A truck for a skateboard or a scooter, having a structural member having an underside, said truck comprising:
   a. a suspension mechanism connected to the structural member and comprising a suspension member having a base disposed in engagement with the underside of the structural member, a first flex member connected to said base and extending angularly outwardly therefrom, and a second flex member connected to said base and extending outwardly therefrom, said first flex member being constructed and arranged to flex toward said second flex member;
   b. a hanger assembly connected to said first flex member, said hanger assembly having a hanger body, a tilt axis, an alignment leg affixed to said hanger body and disposed substantially parallel to said tilt axis, said hanger assembly further comprising a kingpin assembly, an axle and at least one wheel rotatably mounted on said axle, said base of said suspension mechanism being disposed intermediate the underside of said structural member and said kingpin assembly;
   c. an alignment assembly connected to said structural member for maintaining the orientation of said tilt axis of said hanger assembly as said first flex member flexes toward said second flex member; and
   d. a bumper assembly connected to said base of said suspension member, said bumper assembly including a bumper stop engagable by said kingpin assembly.

9. A truck for a skateboard or a scooter, having a structural member having an underside, said truck comprising:
   a. a suspension mechanism connected to the structural member and comprising a suspension member having a base disposed in engagement with the underside of the structural member, a first flex member connected to said base and extending angularly outwardly therefrom, and a second flex member connected to said base and extending outwardly therefrom, said first flex member being constructed and arranged to flex toward said second flex member;
b. a hanger assembly connected to said first flex member, said hanger assembly having a hanger body, a tilt axis, an alignment leg affixed to said hanger body and disposed substantially parallel to said tilt axis, said hanger assembly further comprising a kingpin assembly, an axle and at least one wheel rotatably mounted on said axle, said base of said suspension mechanism being disposed intermediate the underside of said structural member and said kingpin assembly; and
c. an alignment assembly connected to said structural member for maintaining the orientation of said tilt axis of said hanger assembly as said first flex member flexes toward said second flex member, said alignment assembly comprising a sleeve, a bearing carried by said sleeve and a connector member receivable within said bearing.

* * * * *